United States Patent [19]
Yamazaki et al.

[11] Patent Number: 6,063,408
[45] Date of Patent: May 16, 2000

[54] PROCESS FOR PRODUCING CHOCOLATE

[75] Inventors: Katsutoshi Yamazaki; Takahiko Soeda, both of Kawasaki, Japan

[73] Assignee: Ajinomoto Co., Inc., Tokyo, Japan

[21] Appl. No.: 08/838,815

[22] Filed: Apr. 10, 1997

[30] Foreign Application Priority Data

Apr. 10, 1996 [JP] Japan ................................. 8-088322
Feb. 18, 1997 [JP] Japan ................................. 9-033889

[51] Int. Cl.$^7$ .................................................. A23G 1/00
[52] U.S. Cl. ........................... 426/45; 426/52; 426/601; 426/656; 426/660
[58] Field of Search ............................. 426/45, 52, 601, 426/656, 660

[56] References Cited

U.S. PATENT DOCUMENTS

| | | | |
|---|---|---|---|
| 4,895,732 | 1/1990 | Suwa et al. | 426/660 |
| 4,917,904 | 4/1990 | Wakameda et al. | 426/7 |
| 5,055,310 | 10/1991 | Nonaka et al. | 426/46 |
| 5,156,956 | 10/1992 | Motoki et al. | 435/68.1 |
| 5,330,778 | 7/1994 | Stark et al. | 426/531 |
| 5,360,621 | 11/1994 | Mentink et al. | 426/548 |
| 5,681,598 | 10/1997 | Kuraishi et al. | 426/36 |

FOREIGN PATENT DOCUMENTS

| | | |
|---|---|---|
| 0 379 606 | 8/1990 | European Pat. Off. . |
| 358149645 | 9/1983 | Japan . |
| 359059151 | 4/1984 | Japan . |
| WO 94/21130 | 9/1994 | WIPO . |

OTHER PUBLICATIONS

Patent Abstracts of Japan, vol. 8, No. 156 (C–234), Jul. 19, 1984, JP 59 059151, Apr. 4, 1984.

Patent Abstracts of Japan, vol. 7, No. 268 (C–197), Nov. 30, 1983, JP 58 149645, Sep. 6, 1983.

Patent Abstracts of Japan, vol. 18, No. 471 (C–1245), Sep. 2, 1994, JP 06 153807, Jun. 3, 1994.

Patent Abstracts of Japan, JP 09 191 820, Jul. 29, 1997.

*Primary Examiner*—Chhaya D. Sayala
*Attorney, Agent, or Firm*—Oblon, Spivak, McClelland, Maier & Neustadt, P.C.

[57] ABSTRACT

A process is provided for producing a chocolate having improved stability, and which is effective for preventing blooming, particularly fat blooming, the process involving kneading a chocolate starting material with a transglutaminase to effect reaction of the transglutaminase with the starting material.

21 Claims, No Drawings

PROCESS FOR PRODUCING CHOCOLATE

BACKGROUND OF THE INVENTION

1. Field of the Invention

The present invention relates to a process for producing a chocolate having improved stability which is free from blooming even when exposed to high temperatures or stored for a long period of time under severe temperature changes.

2. Discussion of the Background

When chocolate is exposed to high temperatures in summer or stored under such conditions that the temperature varies greatly, a white powder spreads on the surface. This phenomenon is called blooming and notably decreases the commercial value of the chocolate.

Generally, chocolate is prepared by mixing a cacao mass, fats and oils such as cacao butter or the like, cocoa, saccharides, milk powder and the like as required, and subsequently subjecting the mixture to rolling, conching and tempering. Blooming can include either or both of (a) a fat bloom, based on unstable crystals of fats and oils of the starting material, and (b) a sugar bloom, caused by recrystallization of sugar. The former fat bloom is especially common and observed in many cases.

In order to prevent the occurrence of a fat bloom, there have been a variety of previous proposals as noted below.

(1) One method involves incorporation of stable crystalline particles of 2-unsaturated-1,3-di-saturated glyceride composed of an unsaturated fatty acid having 18 or more carbon atoms and a saturated fatty acid having from 20 to 24 carbon atoms in chocolate, with the intent being to keep the original palatability of the chocolate even after it is exposed to a high temperature (close to body temperature) for a fixed period of time (Japanese Patent Publication No. 83,680/1995).

(2) A further method involves use of a sucrose fatty acid ester having a HLB value of 19 or more as an emulsifying agent in the production of chocolate (Japanese Patent Publication No. 108,183/1995).

(3) Another method involves providing a chocolate that incorporates (a) a fatty acid component in a lauric acid-type hard butter and a sucrose fatty acid ester that is myristic acid, and (b) a sucrose fatty acid ester having an average substitution ratio of fatty acid to sucrose of between 5 and 7 (Japanese Patent Publication No. 40,880/1995).

(4) An additional method involves using fats and oils composed mainly of triglyceride in which total carbon atoms of 1,3-saturated-2-unsaturated fatty acid residue are between 50 and 56 (Japanese Patent Publication No. 95,879/1994).

(5) A further method involves formation of a fine crystalline core during solidification when producing chocolate, in order to release the solidified product from a mold, or to retain excellent properties of gloss, palatability, mouth feeling and the like [Japanese Laid-Open Patent Application (Kokai) No. 40,750/1986).

As noted above, the chief improvement that has been made so far relates mainly to the fat component, including cacao butter, a main component of chocolate. However, resistance to high temperature exposure has not been satisfactory yet, and consequently a person sometimes obtains a chocolate having a fat bloom. Further, some fatty acids taste bitter and feel rough. Add to this a further disadvantage that cacao, cacao butter and the like, which are the main starting materials in chocolate production, are natural products and therefore have a wide range of qualities. This greatly influences the qualities of the final product. Thus, treatment of the fat bloom must also take into consideration the qualities of the natural starting materials.

SUMMARY OF THE INVENTION

Accordingly, one object of the present invention is to provide a process for producing a chocolate which has improved stability and does not suffer a fat bloom, even when exposed to high temperatures or stored for an extended period of time in a place where the temperature varies greatly.

A further object of the present invention is to provide a process for producing a chocolate which has improved stability and maintains its flavor even when exposed to high temperatures or stored for an extended period of time in a place where the temperature varies greatly.

A further object of the present invention is to provide a process for the production of chocolate that has improved stability and can retain its shape at high temperatures while maintaining satisfactory mouth-meltability.

These and other objects of the present invention have been satisfied by the discovery that when a chocolate dough is reacted with a transglutaminase, (1) the fat meltability during heating is suppressed, thereby providing shape retention, and (2) the thus-formed chocolate retains its fixed shape without melting even under high temperature conditions such as experienced during summer and the chocolate is free from the occurrence of a fat bloom.

DETAILED DESCRIPTION OF THE PREFERRED EMBODIMENTS

The present invention relates to a process for producing a chocolate having improved stability, comprising kneading the chocolate starting materials including a cacao mass, fats and oils such as a cacao butter or the like, saccharides, a milk powder and the like to form a chocolate dough, wherein the starting materials are reacted with a transglutaminase either prior to kneading or concurrently therewith.

The transglutaminase used in the present invention is an enzyme which catalyzes the acyl transfer reaction of a γ-carboxyamide group of a glutamine residue in a peptide chain of a protein. When the transglutaminase acts on an ξ-amino group of a lysine residue in a protein as an acyl receptor, an ξ-(γ-Glu)Lys linkage is formed in the protein intramolecularly or intermolecularly. The properties of this enzyme are disclosed in detail in, for example, Japanese Laid-open Patent Application (Kokai) No. 27,471/1989, the relevant portions of which are hereby incorporated by reference.

While the present inventors do not intend to be bound by any particular mechanism of action of the transglutaminase, it is believed that the crosslink-polymerization of the protein in the cacao mass starting material is accelerated by the enzymatic activity of the transglutaminase, whereby the chocolate is provided with improved stability and improved heat resistance, so as not to allow occurrence of a fat bloom even upon exposure to high temperatures.

The transglutaminase used in the present process can be either a calcium-independent or a calcium-dependent transglutaminase. Suitable calcium independent transglutaminases include those derived from microorganisms, such as described in Japanese Laid-Open Patent Application (Kokai) No. 27,471/1989, the relevant portions of which are hereby incorporated by reference. Suitable calcium dependent transglutaminases include those derived from guinea pig liver (such as described in Japanese Patent Publication No.

50,382/1989, hereby incorporated by reference), those derived from blood (such as factor XIII) and those derived from fish (such as described in Journal of Japan Fisheries Academy, by Seki Nobuo et al., vol. 56, pp. 125–132 (1990) hereby incorporated by reference). Recombinant transglutaminases can also be used, such as described in Japanese Laid-Open Patent Application (Kokai) Nos. 300, 889/1989 and 199, 883/1993, and WO 93/15234, each of which is hereby incorporated by reference. Thus, the origin of this enzyme and the process for producing the same are not limited in the present invention. However, in view of both function in the use of food and economics, the calcium-independent transglutaminases are preferred.

The amount of transglutaminase used in the present method is 0.05 to 50 units (U), preferably from 0.1 to 20 U, more preferably from 0.2 to 15 U, per gram of the protein of the cacao mass starting material. When the amount is less than 0.05 U, the product is substantially the same as a product formed without using the enzyme, and heat resistance is not improved. When it exceeds 50 U, heat resistance is imparted to the product, but the product becomes too hard, decreasing mouth-meltability.

The activity unit, U, of the transglutaminase referred to in the present invention is measured and defined as follows: Benzyloxycarbonyl-L-glutaminylglycine and hydroxylamine are reacted as substrates. The hydroxamic acid thus formed is converted into an iron complex in the presence of trichloroacetic acid. Then, the absorbence thereof is measured at 525 nm. In this manner, a calibration curve is prepared from the amount of hydroxamic acid. The activity unit of transglutaminase is defined as the amount of the enzyme to form 1 $\mu$mol of hydroxamate for 1 minute in light of the calibration curve. This method is described in Japanese Laid-Open Patent Application (Kokai) No. 27,471/19691, hereby incorporated by reference.

With respect to the transglutaminase reaction conditions, the transglutaminase may be retained at a temperature of from 10 to 65° C. for from 20 to 120 minutes, preferably at a temperature of from 20 to 40° C. for from 30 to 60 minutes. Accordingly, when the conditions in the step of kneading starting materials such as a cacao mass and the like or the conditions in the conching step are consistent with, or included in, the reaction conditions of this enzyme, it is naturally unnecessary to set the reaction conditions of this enzyme.

It has been found that when the chocolate dough contains a small amount of a protein and/or a protein partial hydrolyzate in the reaction with the transglutaminase, the above-mentioned crosslink-polymerization of the protein is expedited, resulting in stabilization of the overall tissue that is effective for preventing blooming.

Examples of the protein to be used in the present invention include wheat proteins, milk proteins, soybean proteins, gelatins and whey proteins. Of these, milk proteins are preferable.

Examples of suitable milk proteins include not only casein but also casein salts such as sodium caseinate, calcium caseinate and potassium caseinate, whole milk powder and skim milk powder.

Suitable protein partial hydrolyzates include substances obtained from wheat proteins, milk proteins, soybean proteins, gelatins or whey proteins.

The wheat protein partial hydrolyzate may be obtained by partially hydrolyzing a wheat protein with an enzyme, acid or alkali. The wheat protein partial hydrolyzate preferably has a deamidation ratio of from 5 to 70 and a weight average molecular weight of from 4,000 to 50,000. The amidation ratio is an index indicating the degree of formation of an α-amino acid by hydrolysis through the catalytic activity of acid, alkali or an enzyme.

The milk protein partial hydrolyzate for use in the present invention can be obtained by partially hydrolyzing the above-mentioned milk protein, namely casein and its salts, whole milk powder or skim milk powder with an enzyme, acid or alkali. A preferable milk protein partial hydrolyzate has a deamidation ratio of from 10 to 40 and a weight average molecular weight of from 400 to 40,000.

Besides the above-mentioned wheat protein partial hydrolyzate and milk protein partial hydrolyzate, a commercial lysine peptide can also be used as a protein partial hydrolyzate. In the present invention, a lysine peptide composed of a single amino acid (i.e. Lysine) is also included in the protein partial hydrolyzate. The lysine peptide is not particularly limited, but one having an weight average molecular weight of from 600 to 40,000 is preferred.

The amount of the protein and/or the protein partial hydrolyzate to be added is usually from 0.001 to 5.0 g, preferably from 0.01 to 1.0 g per gram of the protein of the cacao mass or other main starting material. When the amount is less than 0.001 g, the chocolate is slightly hard on the palate when it is eaten, and the mouth-meltability is poor. When it exceeds 5.0 g, the chocolate is brittle and not viscous, and is quickly melted in the mouth. Thus, it is too soft on the palate. Accordingly, the desired objects of the invention cannot be achieved sufficiently in either case.

The chocolate of the present invention can be of any type, if a cacao mass is used as a main starting material. The present invention is preferably applied to, for example, not only a chocolate having a cacao content of from 21 to 35% but also a chocolate product having a cacao content of from 7 to 15%. Further, the chocolate obtained by the present invention can be used as cake icing, a coating material or a topping material for a cake.

The chocolate is normally produced by mixing the main components, including a cacao mass, fats and oils, such as cacao butter or the like, saccharides and a milk powder, with additives (such as lecithin, which is a dough-preparing agent, and the like), subsequently subjecting the mixture to rolling and conching, then, if desired, further tempering the chocolate dough. The product is then finally cooled and solidified.

The chocolate dough used in the present invention may contain or be free from lecithin.

The cacao butter may be used either alone or in combination with other vegetable fats and oils, such as mowrah fats, illipe fats, shea fats, sal fats, allanbrakkia fats, mango fats, and cochmu fats.

Further, since cacao butter is expensive and is not obtainable in a consistent quality, hard butter can be used instead of cacao butter. Hard butter is thus a cacao butter replacer. Natural products (natural fats and oils) as well as artificial ones obtained by inter esterification and the like can be used as hard butter. Various types of inexpensive hard butters can be used, depending on the type of chocolate product to be made. Hard butters are grouped into tempering hard butters and non-tempering hard butters. Suitable tempering hard butters include non-laurin hard butters containing a transform unsaturated fatty acid as a main component. Suitable non-tempering hard butters include laurin hard butters. Chocolate doughs containing such hard butters suitable for use in the present invention are commercially available.

There are various ways to perform the tempering step. Usually, the tempering step includes at least one step of forcibly cooling a molten oily composition and at least one reheating step. In recent years, this tempering step tends to be omitted because the tempering procedure is generally not simple. Thus, tempering can be omitted by using a hard butter having a high content of elaidic acid, a hard butter in which fatty acids made by inter esterification are randomly distributed or a laurin hard butter.

The chocolate dough for use in the present invention can contain an emulsifying agent if desired. Examples of suitable emulsifying agents include sorbitan fatty acid esters, polyglycerol fatty acid esters, glycerol fatty acid esters and lecithin. When a viscosity reducing agent is used in the present invention, it is advisable to employ a sucrose fatty acid ester. Preferable examples of the unsaturated fatty acid components include oleic acid, palmitoleic acid, linoleic acid, linolenic acid, elaidic acid, erucic acid and arachidonic acid.

In the present invention, the chocolate can be produced by any conventional process for the production of chocolate, with the exception that a step is added in which the transglutaminase is admixed with the chocolate dough to cause the enzyme to act thereon. Also, any conventional starting materials for producing chocolate can be used. It is possible to produce the chocolate using ordinary chocolate production equipment, such as grinders, mixers, refiners and the like.

The present invention includes (1) a process in which (a) a cacao mass or (b) a mixture of a cacao mass and a protein and/or a protein partial hydrolyzate is directly reacted with a transglutaminase, and then fats and oils, such as cacao butter or the like, a sugar powder, an emulsifying agent, such as lecithin or the like, and other additives are added to the transglutaminase reaction mixture; and (2) a process in which (a) a cacao mass or (b) a mixture of a cacao mass and a protein and/or a protein partial hydrolyzate with fats and oils, such as cacao butter or the like, a sugar powder, an emulsifying agent, such as lecithin or the like and other additives is reacted with a transglutaminase in a kneading step. Both of these processes can be used in the present invention.

Of these processes, the process (2) is described in the Examples the follow. The process (1) is explained below.

A transglutaminase is added to a cacao mass (or a mixture of a cacao mass and a protein and/or a protein partial hydrolyzate), and the mixture is reacted at from 10 to 65° C. for from 20 to 120 minutes, preferably for from 40 to 100 minutes. Subsequently, fats and oils, such as cacao butter or the like, a sugar powder, an emulsifying agent and the like are added thereto. The resulting mixture is then ground, and for from 30 to 60 minutes. After the enzymatic reaction is complete in this kneading step, the resulting product is subjected to rolling, conching and tempering in a conventional manner. The resulting product is molded, cooled, released, aged and packed to form a final product.

As mentioned above, the present invention relates to a process for producing a chocolate having improved stability, which process is effective for preventing the occurrence of blooming. The chocolate of the present invention can also be used in various unbaked cakes, and baked cakes such as cookies and the like. Further, the chocolate of the present invention can be used as a filling or spread in a sandwich. Still further, it can also be used in a cold cake and as a paste. Thus, the chocolate of the present invention has a wide range of use.

EXAMPLES

Having generally described this invention, a further understanding can be obtained by reference to certain specific examples which are provided herein for purposes of illustration only and are not intended to be limiting unless otherwise specified.

In the following Examples, a calcium-independent transglutaminase derived from *Streptoverticillium mubaraense* was used as a transglutaminase.

Example 1

A transglutaminase in an amount of from 0.05 to 50 U per gram of a protein of a cacao mass as shown in Table 1 was added to a chocolate dough obtained by fully kneading 40 parts by weight of a cacao mass, 10 parts by weight of a cacao butter, 50 parts of a sugar powder and 0.5 parts of lecithin. The mixture was further kneaded at 30° C. for 60 minutes. Subsequently, the resulting mixture was subjected to rolling, conching and tempering in a conventional manner to form 500 g of each chocolate. The thus-obtained chocolates were stored at 20° C. After 3 weeks, the degree of fat bloom occurrence, and mouth-meltability were evaluated. A control product was produced in the above-mentioned manner except that no transglutaminase was added. As a result, all of the products 1 to 5 of the present invention were more smoothly melted within the mouth than the control product, and the feeling of all invention products during passage through the throat was as good as that of the control product. In the control product, a fat bloom was observed, whereas no fat bloom was observed in all products of the present invention.

TABLE 1

|  | Amount of transglutaminase (U/g · protein of cacao mass) | Degree of occurrence of a fatbloom After storage at 20° C. for 3 weeks | Comments |
| --- | --- | --- | --- |
| Invention Product 1 | 0.05 | − | The chocolate was melted in the mouth more smoothly, and the feeling upon passage through the throat was as good as that of the control product. Thus, the good results were provided. |
| Invention Product 2 | 1 | − | |
| Invention Product 3 | 5 | − | |
| Invention Product 4 | 10 | − | |
| Invention Product 5 | 50 | − | |
| Control Product | 0 | +++ | |

TABLE 2

| Score | Fat bloom |
| --- | --- |
| − | no occurrence |
| ± | slight occurrence |
| + | common occurrence |
| ++ | much occurrence |
| +++ | heavy occurrence |
| ++++ | occurrence on the overall surface |

Example 2

A chocolate was produced under the same conditionas as in Example 1 except using a material containing a transglutaminase (1 U/g•protein of a cacao mass) [Invention product 1], a material containing a transglutaminase (1 U/g-protein of a cacao mass) and a glutamine peptide (made by Kanpina Milk Uni Japan Co., Inc., average molecular weight 7,000, 1.0 g/g-protein of a cacao mass) which is a partial hydrolyzate of a wheat protein [Invention product 2], and a material containing the same amount (1 U/g•protein of a cacao mass) of a transglutaminase and a milk protein partial hydrolyzate ("MA-Z", made by Morinaga Milk Industry Co., Ltd., average molecular weight 10,000, 1.0 g/g-protein of a cacao mass) [Invention product 3]. Each of these chocolates was stored at 20° C. for 3 weeks. A control product was produced in exactly the same manner as the invention products except that a transglutaminase and a protein partial hydrolyzate were not added. The invention products were compared with the control product. As a result, all of the invention products (1), (2) and (3) melted more smoothly within the mouth in comparison with the control product. The feeling of all invention products upon passage through the throat was as good as that of the control product, and no fat bloom was observed in all invention products. By contrast, the control product had poor mouth-meltability, and a fat bloom was considerably observed therein.

Example 3

A chocolate was produced under the same conditions as in Example 1 except using a material containing a transglutaminase (1 U/g•protein of a cacao mass) and sodium caseinate (1 g/g•protein of a cacao mass). This chocolate was stored at 20° C. for 3 weeks.

A control product was produced in exactly the same manner as the invention product except that transglutaminase and sodium caseinate were not added.

The invention product was compared with the control product. As a result, it was found that in comparison with the control product, the invention product had good mouth-meltability and felt smooth, and no fat bloom was observed therein.

In the present invention, a cacao mass and, as required, a protein and/or a protein partial hydrolyzate are reacted with a transglutaminase, whereby an ξ-(γ-Glu)Lys linkage is formed in a protein intramolecularly or intermolecularly. Consequently, a chocolate can be produced which blocks the occurrence of blooming even when exposed to high temperatures or stored for a long period of time in a place where the temperature varies widely, and which retains a smooth feeling and exhibits excellent mouth-meltability. Further, the chocolate of the present invention feels smooth and is smoothly melted in the mouth even when it is used as a coating of an unbaked cake or the like, or as a chocolate topping material of a baked cake.

The present application is based on Japanese Patent Applications 088322/1996 and 033889/1997, filed in the Japanese Patent Office on Apr. 10, 1996 and Feb. 18, 1997, respectively, the contents of each of which are hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for producing a chocolate comprising:
   providing a starting material comprising a cacao mass;
   kneading the starting material with a transglutaminase under conditions sufficient to cause reaction between said transglutaminase and said starting material; and
   subjecting the resulting mixture to rolling, conching, and solidifying.

2. The process as claimed in claim 1, wherein said starting material further comprises at least one member selected from the group consisting of fats, oils, cocoa, saccharides, proteins and protein partial hydrolyzates.

3. The process as claimed in claim 1, wherein said starting material consists of a cacao mass and wherein the process further comprises a step of admixing the material, after kneading with the transglutaminase, with at least one member selected from the group consisting of fats, oils, cocoa, saccharides, proteins and protein partial hydrolyzates.

4. The process as claimed in claim 1, wherein said starting material further comprises a protein, a protein partial hydrolyzate or both.

5. The process as claimed in claim 1, wherein said transglutaminase is present in an amount of from 0.05 to 50 U per gram of protein contained in the starting material.

6. The process as claimed in claim 1, wherein said transglutaminase is present in an amount of from 0.1 to 20 U per gram of protein contained in the starting material.

7. The process as claimed in claim 1, wherein said transglutaminase is present in an amount of from 0.2 to 15 U per gram of protein contained in the starting material.

8. The process as claimed in claim 1, wherein said step of kneading is performed at a temperature of from 10 to 65° C. for from 20 to 120 minutes.

9. The process as claimed in claim 1, wherein said step of kneading is performed at a temperature of from 20 to 40° C. for from 30 to 60 minutes.

10. The process as claimed in claim 1, wherein said starting material further comprises a protein selected from the group consisting of wheat proteins, milk proteins, soybean proteins, gelatins and whey proteins.

11. The process as claimed in claim 10, wherein said protein is a milk protein.

12. The process as claimed in claim 1, wherein said starting material further comprises a protein partial hydrolyzate selected from the group consisting of wheat protein partial hydrolyzates, milk protein partial hydrolyzates, soybean protein partial hydrolyzates, gelatin partial hydrolyzates and whey protein partial hydrolyzates.

13. The process as claimed in claim 12, wherein said protein partial hydrolyzate is a milk protein partial hydrolyzate.

14. The process as claimed in claim 1, wherein said starting material further comprises a lysine peptide having a weight average molecular weight of from 600 to 40,000.

15. The process as claimed in claim 1, wherein said subjecting step further comprises a step of tempering after conching and before solidifying.

16. A process for producing a chocolate comprising:
   providing a starting material comprising a cacao mass;
   reacting the starting material with a transglutaminase under conditions sufficient to cause reaction between said transglutaminase and said starting material; and
   subjecting the resulting mixture to kneading, rolling, conching, and solidifying.

17. The process as claimed in claim 16, wherein said starting material further comprises at least one member selected from the group consisting of fats, oils, cocoa, saccharides, proteins and protein partial hydrolyzates.

18. The process as claimed in claim 16, wherein said starting material consists of a cacao mass and wherein the process further comprises a step of admixing the material, after kneading with the transglutaminase, with at least one member selected from the group consisting of fats, oils, cocoa, saccharides, proteins and protein partial hydrolyzates.

19. The process as claimed in claim 16, wherein said transglutaminase is present in an amount of from 0.05 to 50 U per gram of protein contained in the starting material.

20. A chocolate produced by the process as claimed in claim 1.

21. A chocolate produced by the process as claimed in claim 16.

* * * * *